Patented Mar. 31, 1925.

1,531,386

UNITED STATES PATENT OFFICE.

HANS GERDIEN, OF BERLIN-GRUNEWALD, GERMANY, ASSIGNOR TO SIEMENS & HALSKE AKTIENGESELLSCHAFT, OF SIEMENSSTADT, NEAR BERLIN, GERMANY, A CORPORATION OF GERMANY.

ELECTROLYTIC PROCESS.

Application filed January 3, 1924. Serial No. 684,227.

*To all whom it may concern:*

Be it known that I, HANS GERDIEN, a citizen of the German Republic, residing at Berlin-Grunewald, Germany, have invented certain new and useful Improvements in Electrolytic Processes, of which the following is a specification.

The invention relates to improvements in electrolytic processes.

The chemical processes, which take place under the electrolytic action of the electric current depend upon the temperature as well as the current density in the electrolyte, particularly at the electrode.

In order to enable the current density in the electrolyte, to be increased without an increase in the temperature, the electrolyte is according to my invention kept in continual motion at the point where the current enters it from the electrode. By the motion of the electrolyte the heat and the gas bubbles are quickly carried off, while in the quiescent or stagnant electrolyte the rising of the temperature and the appearance of gas bubbles sets a limit to the increase of the current density.

In order to enable the attainment of a high current density at the point where the current passes from the electrode into the electrolyte, the electrode is furthermore, according to my invention constructed as a tubular vessel, which is insulated towards the outside and provided with an opening for the passage of the current to the other electrode situated outside. The electrode is preferably made in the form of a tube through which the electrolyte is passed.

Apparatus for carrying out the improved process is illustrated in the accompanying drawing, representing in:—

Fig. 1 a vertical section through an apparatus suitable for producing ozone according to the improved process and Fig. 2 a modified apparatus in vertical section.

Referring to Fig. 1, the electrode at which the high current density is to be attained is indicated by the numeral 1. It has the form of the envelope of a truncated cone and forms the continuation of the glass tube 2. The electrode and the glass tube are surrounded by a glass cylinder 3 of larger diameter, which at the lower tapering end is turned inwards at the edge, so that it forms a tight seal with the electrode 1. The annular space thus formed is filled with mercury into which the current is conducted through the conductor 4 and the lead 5. The whole is suspended in a vessel 6 which contains the electrolyte and is provided with an overflow 7. In the electrolyte is suspended the second electrode 8 with the lead 9. The electrolyte flows into the glass tube 2 from the top and issues from the lower narrower end of the electrode 1 with a velocity, which suffices to carry off the heat generated by the current. The passage of the current from the tube 1 into the electrolyte takes place essentially at the lower edge, as an appreciable difference in potential does not exist within the hollow space formed by the tube 1 and consequently no current lines can be generated, so that the total current is crowded together at the lower edge. The current is conducted to this place by the tube itself and through the mercury with so low an ohmic resistance, that the heating within the electrode remains within moderate limits even if the current density at the lower edge of the electrode is considerably higher than 100 amps. per sq. cm.

For many purposes it is desirable to be able to lead off the gases produced at both electrodes separately. An apparatus suitable for the purpose is illustrated in Fig. 2. The conical tube 11 of the platinum, which forms the electrode points upwards with its narrow end, where it is joined to a glass body 12 which contains a portion of the electrolyte with the second electrode 18 dipping into it. This second electrode receives its current from the source of current 31 through the conductor 19. In order to reduce the ohmic resistance in the electrolyte, it may be brought up very close to the upper edge of the electrode 11. With its lower wider edge the platinum tube 11 is tightly sealed against the glass body 13. The space between the two glass bodies 12 and 13 is filled with mercury into which the current is passed by the metal rod 14 and the lead 15. The whole is suspended in a vessel 16, which contains the other portion of the electrolyte. The electrolyte is forced into the upper end of the platinum tube 11 through the nozzle 17 with such a velocity, that only a portion enters into the platinum tube.

March 31, 1925.
J. J. COOPER
SILENT SOUNDER
Filed Nov. 22, 1920
1,531,543
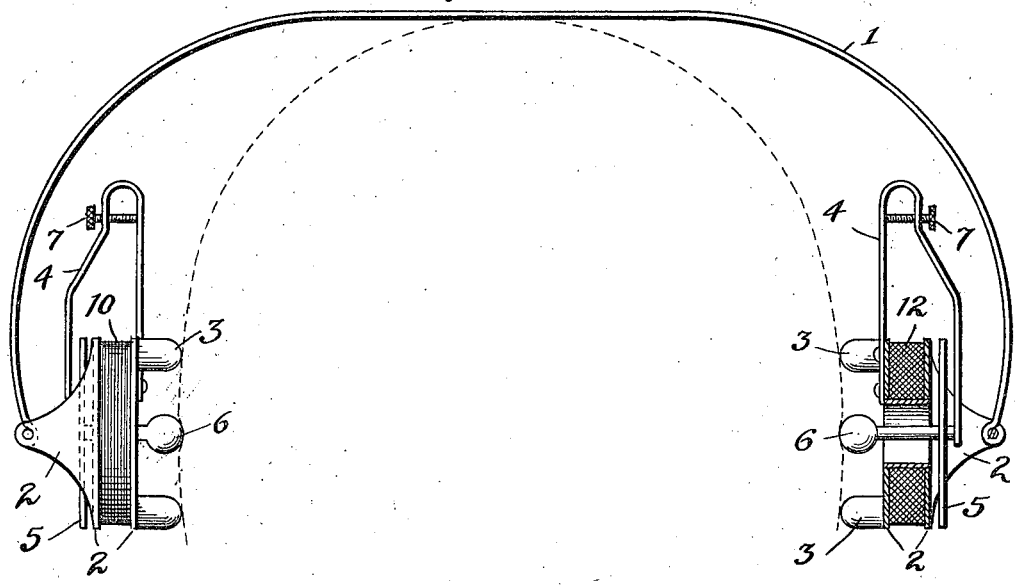
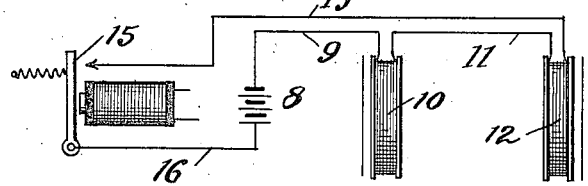
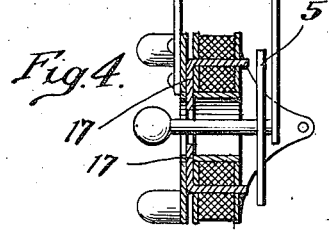
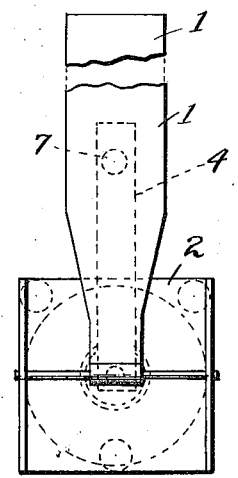
Inventor
James J. Cooper
By Edward E. Clement
Attorney